Feb. 10, 1953
C. G. ECKERS
2,628,022
METHOD FOR RECOVERING PROTEIN FROM
PROTEIN CONTAINING MATERIAL
Filed Feb. 16, 1949
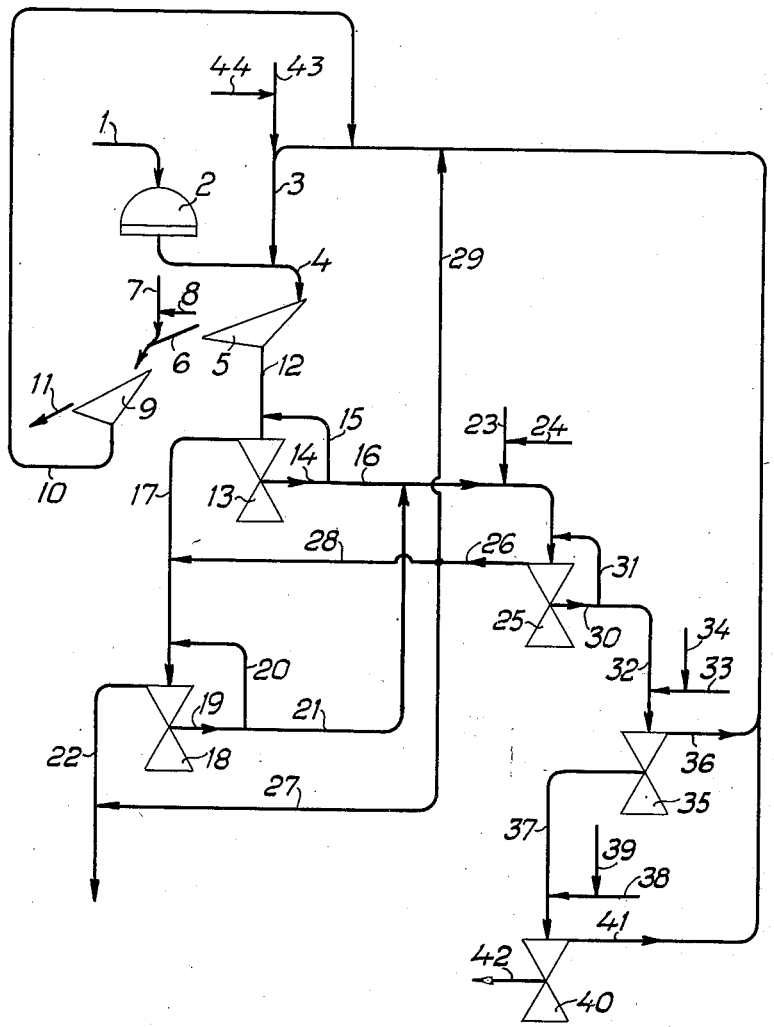
Inventor
Carl Göran Eckers
By Davis, Hoxie & Faithfull
Attorneys Patented Feb. 10, 1953

2,628,022

UNITED STATES PATENT OFFICE 2,628,022

METHOD FOR RECOVERING PROTEIN FROM PROTEIN CONTAINING MATERIAL

Carl Goran Eckers, Stockholm, Sweden, assignor, by direct and mesne assignments, of one-half to Aktiebolaget Separator, Stockholm, Sweden, a corporation of Sweden, and one-half to Imperial Chemical Industries, Limited, London, England, a corporation of Great Britain Application February 16, 1949, Serial No. 76,695
In Sweden February 18, 1948

9 Claims. (Cl. 233—18)

This invention relates to the recovery of protein from protein-containing material, and more particularly to an improved process for this purpose.

Protein for industrial purposes is recovered from protein-containing material, such as peanuts and soya beans. This is usually done in the following way: After peeling the raw material, it is pressed for separation of oil and fat and is then treated with a solvent, for instance, benzol or benzene for extraction of the remaining oil and fat. Oil and fat are sometimes extracted from the raw material by means of solvents only, which is a cheaper procedure, but the oil will be of inferior quality. When oil and fat have thus been extracted, a mass is obtained which consists mainly of fibres and proteins. This is subjected to grinding followed by mixing with water containing chemicals, such as alkali and/or acid, so as to obtain a pH-value such that the proteins are wholly or partly dissolved. The liquid thus obtained also contains undissolved substances, which are removed by a treatment generally consisting of a combined filtering or straining and centrifugal separation. These procedures should be carried out in such a way that the loss of protein-containing liquid is as low as possible. The solid substances consist mainly of fibres. Due to the presence of fibres of very small sizes, filter cloths such as textile cloth, which retain all the impurities and produce a clear liquid, cannot be used. For the removal of the solids, metal gauze with 80–100 meshes per inch is therefore generally used, and so part of the fine fibres pass through the strainer and contaminate the strained liquid. Part of the fine fibres, however, stick to the large fibres on the strainer gauze and can therefore be taken out of the process with the large fibres as a pulp or paste, which also contains a certain quantity of protein solution. The strained and separated liquid is then treated chemically and mechanically, causing the proteins to be transformed into solid state and making it possible to recover it. The solid impurities removed in the separation of the fibres may be directly withdrawn from the process, or subjected to washing, or returned to the process for recovering of protein remaining in solution in the impurities.

The method described above involves certain inconveniences. For instance, the strainer is often subject to disturbances in its operation, because it is necessary that part of the fine fibres be removed on the filter, but without causing clogging of the same. Another inconvenience is that the fibres are removed from the strainer in a moist state, which means a protein loss corresponding to the amount of moisture. In returning protein washed out from the fibres or concentrate of finer fibres, there is a risk of increasing the amount of fine fibres in the system.

The present invention has for its principal object the provision of an improved method for continuous removal of solid substances, such as fibres, from liquid containing dissolved protein.

According to the invention, the liquid is subjected to coarse-straining to remove such solid impurities, if any, as may clog the nozzles in centrifugal separators used for separation after the straining. The strained liquid, which contains a considerable part of the solid impurities, is then subjected to preliminary separation in a centrifuge, in which the majority of the large particles are continuously separated as sludge concentrate. This separation is effected by centrifuges of the type having sludge discharge openings, for instance, nozzles, located at or near the periphery of the separator bowl, through which the sludge, in spite of its tendency to form deposits having a small angle of repose in the bowl, can be discharged in a highly concentrated state. After this separation, the liquid still contains too many fibres, which, however, are of small size and very light. The liquid is therefore subjected to a final separation, the so-called fine-separation. This is carried out in centrifugal separators of a construction different from the first-mentioned machines. They are provided with sludge discharge channels having their inlets at the largest diameter of the inside of the bowl and their outlets near the center of the bowl. These separator bowls can be constructed with very steep walls because the sludge which is separated on them has very little tendency to deposit on the inside of the bowl wall. Such separators are used particularly in the yeast industry and will therefore, for the sake of simplicity, be referred to as yeast separators. Since the content of solid impurities in the liquid to be treated may be comparatively low, and since, for practical reasons, it is undesirable to use too small nozzles, it may be advantageous to return part of the concentrate from the separator either to the inlet of the separator or through separate channels having their outlet openings near the nozzles in the separator bowl.

The concentrate obtained in the first centrifugal separation is mixed with the concentrate from the second centrifugal separation, and then a liquid containing chemicals for obtaining the desired pH-value may be added. The sludge concentrate is then subjected to separation (concentration) in centrifugal separators provided with sludge discharge openings or nozzles for continuous discharge of the separated sludge. In this separation, the throughput rate is regulated in such a way that the liquid component from the separator is so pure that it can be returned to the system without causing a continuous increase of the content of the solid impurities in the system, i. e., so that after a certain period of operation the content of solids in the system will remain substantially constant because the separators remove the same amount of solids as is introduced into the process. If no liquid is added to the concentrate from the first and second separations, and if the separation of the concentrate is carried out in such a way that the liquid component has the same purity as that obtained in the fine-separation (the second separation), these two liquid components can be mixed. Since, however, it is desired to obtain high concentration of the sludge concentrate, it may occur that, due to variation in the operating conditions of the separation, the liquid component may acquire an excessively high fibre content, and it may therefore be desirable to mix this liquid component with the liquid intended for fine-separation, although this means that the number of separators for this separation may have to be increased. If, on the other hand, to the concentrate obtained in the first and second separations a liquid is added prior to the separation of the concentrate, the liquid component obtained in this separation should be returned to the beginning of the process, i. e., where liquid is added for dissolving the protein. The sludge concentrate obtained in the concentrate separation can also be mixed with liquid, possibly containing chemicals for obtaining the desired pH-value, and subjected to further separation in which the throughput rate is adjusted in the same way as in the first separation, the separated liquid being returned to the beginning of the process. The dilution and separation of sludge concentrate and returning of separated liquid to the beginning of the process may be repeated any number of times.

A preferred practice of the invention will now be described, by way of example, in connection with the accompanying drawing, in which the single illustration is a schematic view of an installation suitable for carrying out the process.

Referring to the drawing, the raw material, from which the main part of the oil and fat may have been removed and which consists mainly of protein substances and fibres, is fed through a pipe 1 to a mill 2, in which the material is ground. Then, or possibly simultaneously, liquid is added, as by means of a pipe 3, in such a way that a pH-value of about 9 is obtained. The suspension is then conducted through a pipe 4 to a coarse strainer 5, which removes principally those particles larger than the sludge discharge openings in the centrifugal separators in which the suspension is later separated. The removed coarse particles are conducted to a second strainer 9, after addition of liquid and chemicals through pipes 7 and 8, respectively. From strainer 9, the liquid is returned through a pipe 10 to the pipe 3. Further strainings, with addition of liquid to the effluent from the outlet 11, may be affected in any desirable number, the strained liquid each time being returned to the pipe 3.

The liquid obtained from the main straining 5, which contains a large part of the original solid substances, is conducted through a pipe 12 to a centrifugal separator 13 of the type having a bowl with peripheral discharge nozzles for the separated solids. There it is subjected to a preliminary separation in which the main part of the solid substances is separated from the liquid and discharged as a concentrate through the bowl nozzles and the outlet 14 and is partly returned to the inlet of the separator, as shown at 15, or directly to the nozzles in the interior of the bowl. The rest is conducted through a pipe 16 for further treatment. The liquid component from the separator 13, which is conducted through a pipe 17, is subjected to a highly efficient separation in a centrifugal separator 18 provided with sludge discharge channels through which the sludge is discharged from the largest diameter of the separator bowl through the said channels to a point nearer the center of the bowl. The bowls of the separators used for this separation can be constructed with "steeper" walls (smaller cone angle) than is usual for other nozzle separators, because the particles are small and light and therefore have no considerable tendency to form deposits with a steep angle of repose on the bowl walls. The sludge concentrate discharged at 19 from this fine-separation can also be returned to some extent to the centrifuge inlet through a pipe 20, in the same way as indicated for the separator 13. Considering the generally low solids content of the liquid conducted through the pipe 17 to the separator 18, it is suitable to return part of the sludge concentrate in the described way, because the sludge outlets of the separator can be given sizes that are suitable for practical running. However, too much concentrate should not be returned because, if the concentration is carried too far, undesirable deposits may be formed in the separator bowl, although the sludge is light. The part of the sludge which is not returned to the inlet or directly to the nozzles of the separator 18 is conducted through a pipe 21 for further treatment. The liquid component obtained from this final separation is passed through a pipe 22 for precipitation and recovery of proteins.

For the further treatment of the sludge concentrates obtained from the two separations at 13 and 18, the concentrates are first brought together, and then liquid may be added to them through a pipe 23. The regulation of the desired pH-value for this liquid is effected by addition of chemicals through a pipe 24. The sludge concentrate is then concentrated in a centrifugal separator 25. Because the concentration of the concentrate discharged from the separator 18, as pointed out above, cannot be carried too far, it may be suitable to carry out the concentration without previous addition of liquid through the pipe 23. The concentrate separation is thus accomplished without dilution of the protein solution, and the liquid component discharged from the concentrator separator 25 through the pipe 26 can therefore be returned and mixed with the pure protein solution discharged from the separator 18 through pipe 22, either by means of a pipe 27 leading directly from pipe 26 to pipe 22, or by means of a pipe 28 leading from pipe 26 to pipe 17 which feeds the separator 18. The concentration at 25 should be carried out in such a way that the highest possible content of solids is obtained in the concentrate leaving the separator 25 through the outlet 30. Due to variations in operating conditions, it may happen that the liquid component discharged through the outlet 26 may sometimes contain too many fibres, and returning this liquid component to the inlet of the separator 18 through the pipe 28 is therefore preferable in spite of the fact that the number of separators 18 (or their capacities) for the second separation will have to be increased. If the concentrates from the separators 13 and 18 are diluted with liquid through the pipe 23 before the separation in the separator 25, it is preferable that the liquid component discharged through the outlet 26 be returned through a pipe 29 to the pipe 3.

As regards the regulation of the separation of concentrate in the separator 25, it should be so regulated that the outseparated liquid component has a degree of purity such that it can be returned to the system without increasing the solids therein above the point where the same amount as is introduced into the process is removed. Part of the sludge concentrate from the concentrator separator 25 can, in the same way as indicated for the separators 13 and 18, be recirculated through the separator by passing part of it through a pipe 31. The rest of the concentrate can be conducted through a pipe 32 to a separator 35 after addition, if desired, of liquid and chemicals introduced through the pipes 33 and 34, respectively, for adjusting the pH-value. This separation is carried out in the same way as the one previously mentioned. Care should be taken, however, that the liquid component leaving the separator 35 through the outlet 36 is returned to the pipe 3, because this has a lower content of dissolved protein. The concentrate passing from the separator 35 through pipe 37 may be mixed with liquid from pipe 38 and chemicals from pipe 39 and re-separated in centrifuge 40, from which the liquid component is returned through pipe 41 to pipe 3. This is only an example and it is evident that this separation process can be indefinitely varied with any desired number of separation stages.

A liquid with a predetermined pH-value is introduced into the process through the pipe 3, and its quantity must be in direct relation to the amount of press residue. In order to obtain this liquid balance, liquid and chemicals in sufficient quantities are fed into the system through pipes 43 and 44.

It will be understood that each of the separations in the centrifuges 13, 18, 25, 35 and 40 is effected in a centrifugal bowl or locus of centrifugal force which is preferably provided with peripheral nozzles for continuous discharge of the separated solids as a concentrate, although in the case of the centrifuge 18 for the second or fine separation, the solids are preferably discharged from the peripheral part of the bowl chamber through passages leading toward the bowl axis, as previously mentioned. As such centrifuges are well known in the centrifugal art, the details of their construction do not require description or illustration.

I claim:

1. In the production of substantially pure protein from a liquid containing dissolved protein and undissolved impurities, by coarse-straining the liquid to separate the relatively large solid impurities therefrom, subjecting the strained liquid to a first and coarse centrifugal separation in which the main part of the suspended impurities are removed from the liquid, and discharging a concentrate of suspended impurities from said centrifugal separation, the improvement which comprises subjecting the separated liquid from said first centrifugal separation to a second and fine centrifugal separation in which additional solid impurities are removed from the liquid, discharging said last impurities from the second centrifugal separation in the form of a concentrate as a heavier component while discharging the liquid as a lighter component from said second separation, mixing said discharged concentrates together, subjecting the concentrate mixture to a third centrifugal separation in a locus of centrifugal force to separate solids from liquid, continuously discharging the separated solids from said locus through the periphery thereof, returning the separated liquid and residual solids therein from said locus to the process for further centrifugal separation, and regulating the throughput rate in said locus to discharge said liquid therefrom at a degree of purity such that the total amount of solids removed by said separations is at least as great as the amount of solids introduced into the process with the liquid to be treated.

2. The improvement according to claim 1, in which said first centrifugal separation is effected in a locus of centrifugal force from which the separated impurities are discharged through the periphery of the locus, and in which the second centrifugal separation is effected in a locus of centrifugal force from which the solid impurities are passed from the perihpery of the locus to a point of discharge nearer the locus axis.

3. The improvement according to claim 1, in which said concentrates are mixed with liquid prior to said centrifugal separation of the concentrate mixture.

4. The improvement according to claim 1, in which, prior to said centrifugal separation of the concentrate mixture, the concentrates are mixed with a liquid containing chemicals to adjust the pH value of the cencentrates.

5. The improvement according to claim 1, in which the separated liquid from said locus is mixed with the separated liquid from said second centrifugal separation.

6. The improvement according to claim 1, in which the separated liquid from said locus is conducted to the inlet to said second centrifugal separation.

7. The improvement according to claim 1, in which the separated liquid from said locus is returned to the process in advance of said first centrifugal separation, and there utilizing it to dissolve proteins in the liquid.

8. The improvement according to claim 1, comprising also the steps of mixing a liquid with the solids from said locus and subjecting the same to an additional centrifugal separation to remove liquid from the mixture, returning said last liquid to the process from said last separation, and regulating the throughput rate in said last separation to obtain the liquid therefrom at a degree of purity such that the total amount of solids removed by said separations is at least as great as the amount of solids introduced into the process with the liquid to be treated.

9. The improvement according to claim 1, in which the coarse solids removed by said straining are diluted with a liquid and subjected to further straining to separate liquid from the solids, and in which said last liquid is returned to the process.

CARL GORAN ECKERS.

REFERENCES CITED

The following references are of record in the file of this patent:

UNITED STATES PATENTS

| Number | Name | Date |
|---|---|---|
| 1,754,774 | Sharples | Apr. 15, 1930 |
| 1,794,105 | David | Feb. 24, 1931 |
| 2,097,531 | Peltzer | Nov. 2, 1937 |
| 2,186,037 | Peltzer | Jan. 9, 1940 |
| 2,230,624 | McLean | Feb. 4, 1941 |
| 2,260,640 | Rawlings | Oct. 28, 1941 |
| 2,424,408 | McGeoch | July 22, 1947 |
| 2,467,402 | Pascal | Apr. 19, 1949 |
| 2,479,481 | Eberl | Aug. 16, 1949 |

FOREIGN PATENTS

| Number | Country | Date |
|---|---|---|
| 524,327 | Great Britain | Aug. 5, 1940 |